United States Patent [19]

Hara et al.

[11] Patent Number: 4,519,089
[45] Date of Patent: May 21, 1985

[54] SYSTEM FOR DETECTING NEUTRAL STATE OF A TRANSMISSION OF AN ENGINE FOR VEHICLES

[75] Inventors: Kazuo Hara, Musashino; Kunihiro Abe, Higashimurayama, both of Japan

[73] Assignee: Fuji Jukogyo Kabushiki Kaisha, Tokyo, Japan

[21] Appl. No.: 334,057

[22] Filed: Dec. 23, 1981

[30] Foreign Application Priority Data

Dec. 27, 1980 [JP] Japan .............................. 55-187175

[51] Int. Cl.$^3$ .............................................. G07C 1/00
[52] U.S. Cl. ...................................... 377/16; 123/339
[58] Field of Search ............... 377/16, 29, 2, 19, 39; 324/160, 140, 52 F; 364/431.05, 431.03, 431.09, 426; 340/679, 681; 192/0.046, 0.062, 0.08, 0.076, 0.033; 74/866; 123/339

[56] References Cited

U.S. PATENT DOCUMENTS

| | | | |
|---|---|---|---|
| 4,294,341 | 10/1981 | Swart | 74/866 |
| 4,320,381 | 3/1982 | Olivier | 340/52 F |
| 4,371,050 | 2/1983 | Ikeura | 180/271 |
| 4,408,293 | 10/1983 | Avins | 364/426 |
| 4,446,832 | 5/1984 | Matsumura et al. | 123/339 |

Primary Examiner—Stanley D. Miller
Assistant Examiner—K. Ohralik
Attorney, Agent, or Firm—Martin A. Farber

[57] ABSTRACT

A system for detecting a neutral state of a transmission for an engine mounted on a vehicle comprises an engine speed detecting device for producing an engine speed output signal in proportion to the engine speed; and a vehicle speed detecting device for producing a vehicle speed output signal in proportion to the vehicle speed. An operation circuit is provided for judging whether the ratio of the engine speed output to the vehicle speed output is in a transmission ratio range dependent on the transmission. The operation circuit is so arranged as to produce at least one neutral state output when the ratio of the engine speed output to the vehicle speed output is not in the transmission ratio range. The operation circuit comprises counters for counting the output pulses, circuits for producing signals for deciding the period of operation of the counters, and circuits including a gate circuit for producing the neutral state output in dependency on the result of the counting during the period of the counter operation.

7 Claims, 10 Drawing Figures

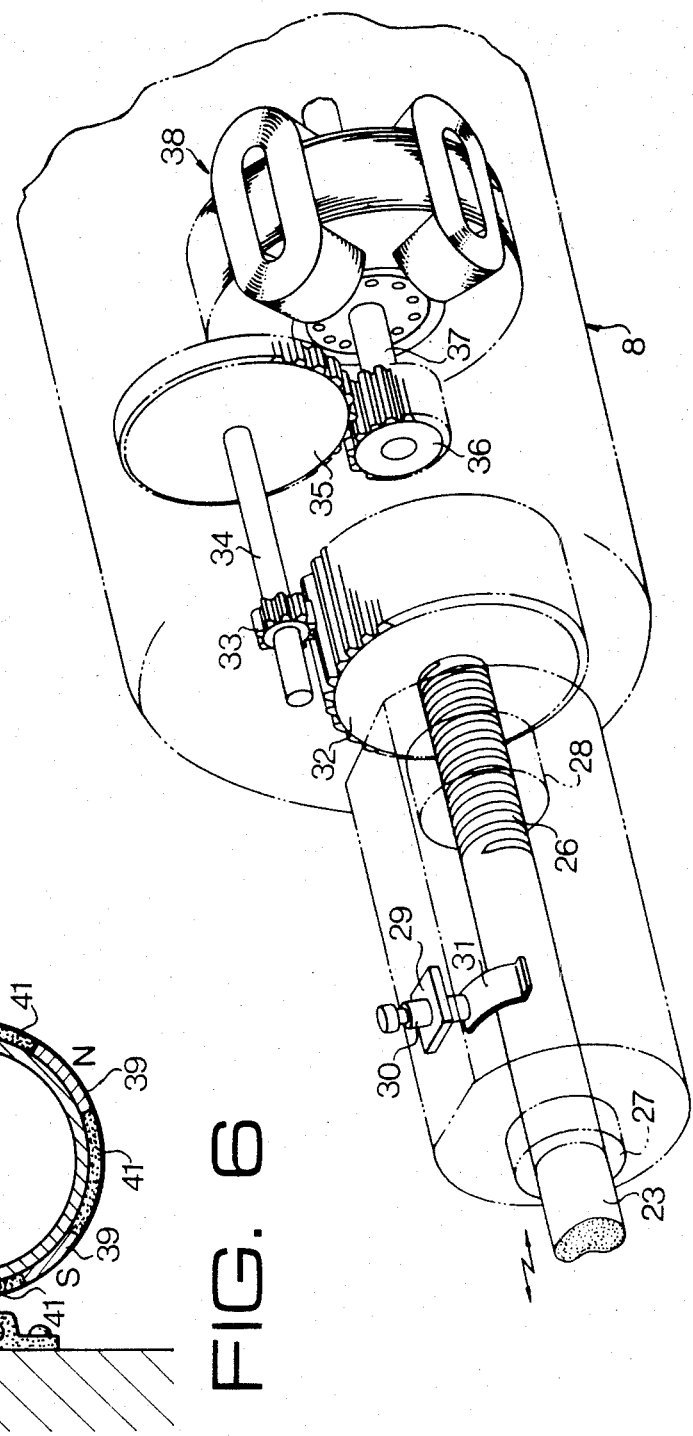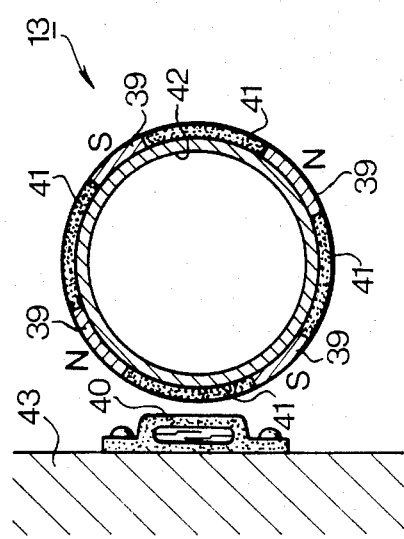

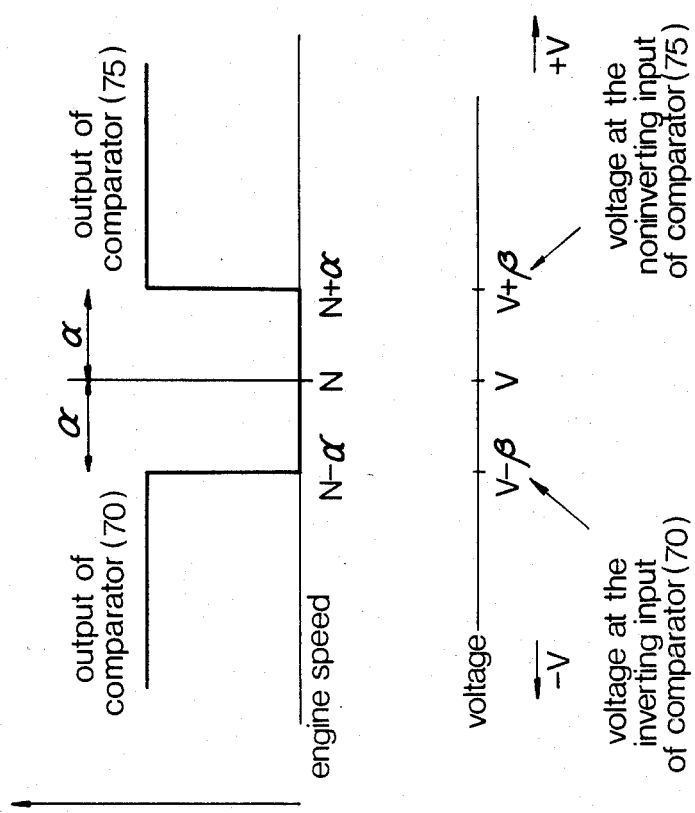

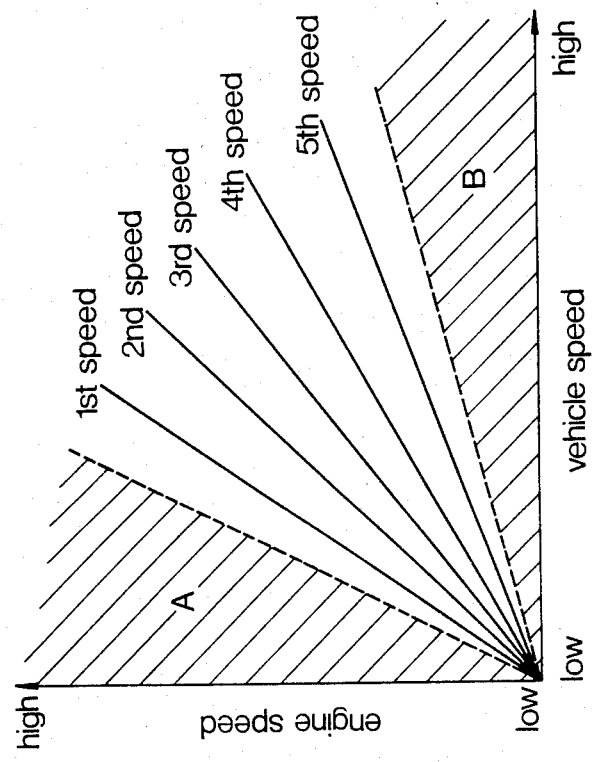

SYSTEM FOR DETECTING NEUTRAL STATE OF A TRANSMISSION OF AN ENGINE FOR VEHICLES

BACKGROUND OF THE INVENTION

The present invention relates to a system for detecting the neutral state of a transmission for an engine for vehicles.

Heretofore, an engine speed control system has been provided for controlling the engine speed. The system is, for example, adapted to control idling speed to a desired idling speed by adjusting the amount of air or the amount of the air-fuel mixture to be induced in the engine in dependency on an error signal which is the difference between a desired reference idling speed and the detected idling speed. In such an automatic, engine speed control system, the detecting of the neutral state of a transmission is necessary.

A conventional neutral state detecting system comprises a clutch switch provided adjacent to a clutch pedal of the vehicle and a neutral switch provided in the transmission. The neutral state detecting system operates to judge the neutral state of the transmission from two signals obtained by the above described switches for producing a neutral signal.

However, since the neutral switch is provided in the transmission, the switch is complicated in construction and expensive.

The object of the present invention is to provide a neutral state detecting system which reliably detects the neutral state and which has a simplified construction.

According to the present invention, there is provided a system for detecting the neutral state of a transmission for an engine mounted on a vehicle comprising an engine speed detecting means for producing an engine speed output signal proportion to the engine speed; a vehicle speed detecting means for producing a vehicle speed output signal in proportion to the vehicle speed; an operation circuit for judging whether the ratio of the engine speed output to the vehicle speed output is in a transmission ratio range dependent on the transmission; the operation circuit being so arranged as to produce at least one neutral state output when the ratio is not in the transmission ratio range.

Other objects and features of the present invention will be fully described with reference to the accompanying drawings.

BRIEF DESCRIPTION OF THE DRAWINGS

FIG. 5 is a perspective view showing the internal construction of the actuator;

FIG. 6 is a sectional view showing a vehicle speed sensor;

FIG. 9 is a graph showing outputs of comparators in the control circuit of FIG. 7; and FIG. 10 is a graph for explaining the principle of the present invention.

DETAILED DESCRIPTION OF THE PREFERRED EMBODIMENTS

Figure 1:
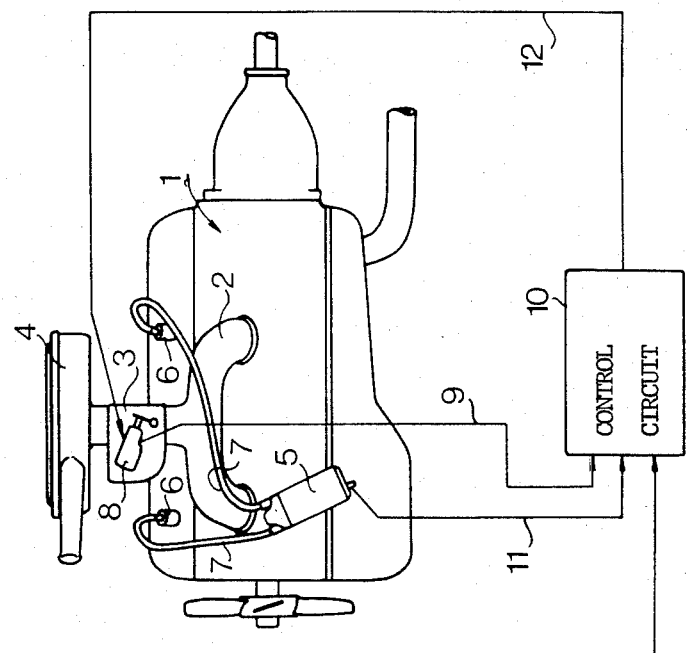
FIG. 1 is a schematic diagram showing a system of the present invention.

Referring to FIG. 1, an internal combustion engine 1 mounted on a vehicle (not shown itself) is provided with an intake manifold 2, a carburetor 3, an air cleaner 4, an ignition coil 5, and spark plugs 6 connected to the ignition coil through a lead 7, respectively. An actuator 8 for operating a throttle valve 18 (FIG. 2) in the carburetor is supported on the side wall of the carburetor 3. The actuator 8 includes an idling sensing switch which is hereinafter described. Idling signals produced by the idling sensing switch in the actuator 8 are sent to a control circuit 10 by a lead 9. Pulses produced in synchronism with ignition pulses are also supplied to the control circuit 10 through a lead 11. The output of the control circuit 10 is connected to the actuator 8 by a lead 12.

A vehicle speed sensor 13 is connected to an axle on a front wheel 14 of the vehicle by a speedometer cable 15. The output of the vehicle speed sensor 13 is applied to the control circuit 10 by a lead 16.

Figure 2:
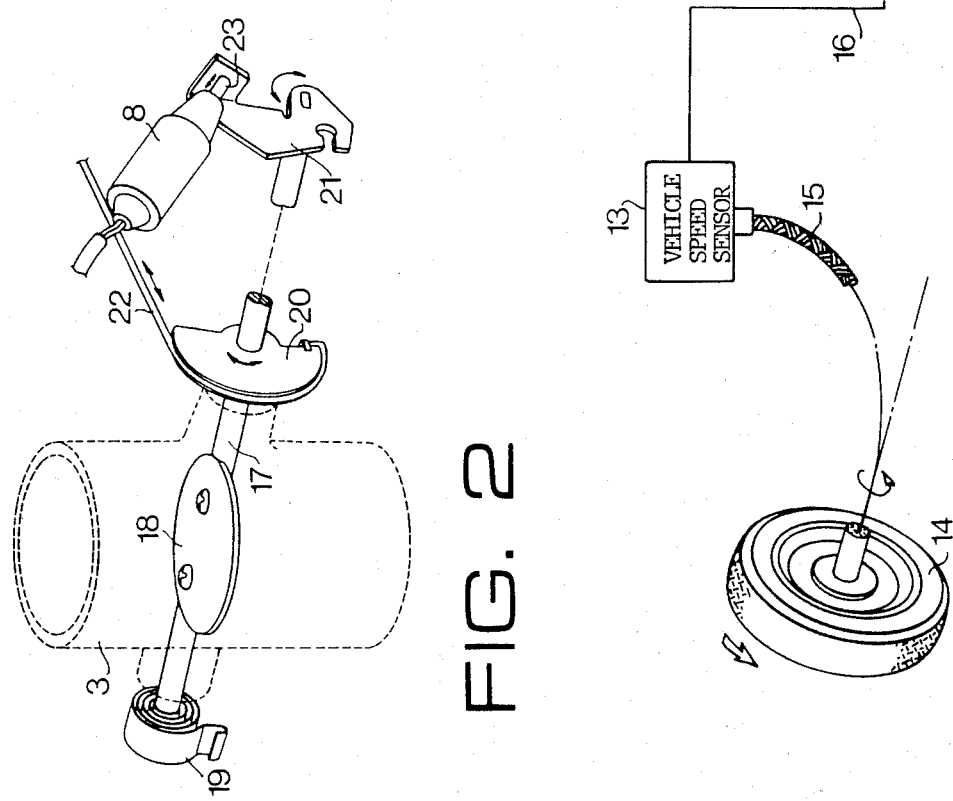
FIG. 2 is a perspective view showing a carburetor and attachments thereof.
Figure 3:
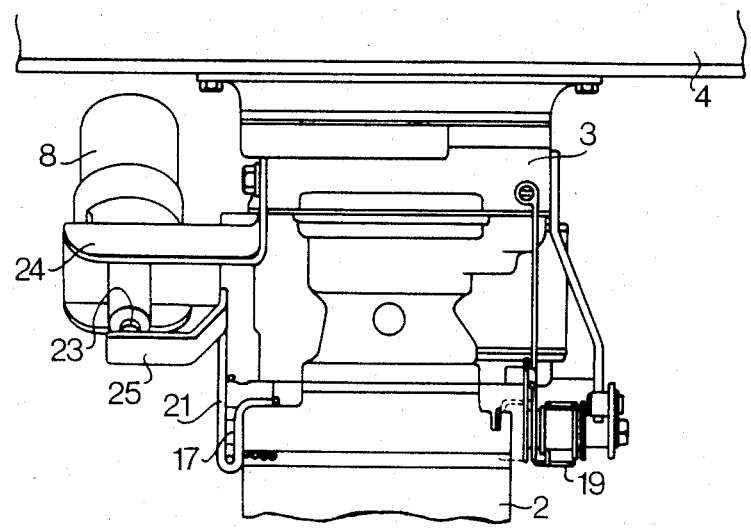
FIG. 3 is a front view of an actuator for the carburetor.
Figure 4:
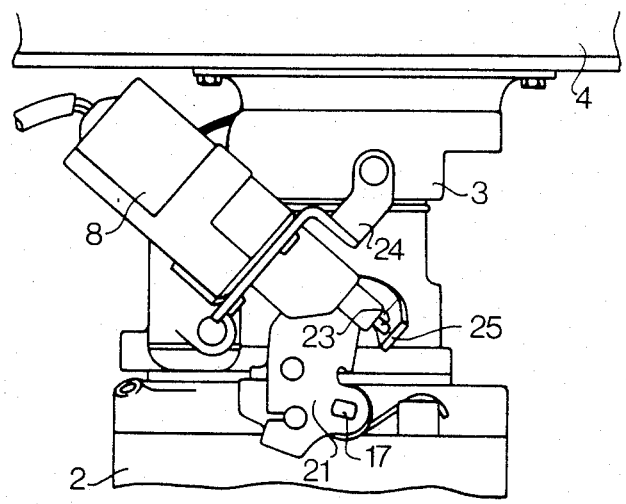
FIG. 4 is a side view of the actuator.

Referring to FIG. 2, a throttle shaft 17 of the throttle valve 18 is rotatably supported in the carburetor 3, one end of the throttle shaft 17 being secured to the inner end of a spring 19 which exerts a spring force on the throttle shaft 17 biasing the throttle valve 18 to close. A wire connector 20 and a lever 21 are secured to the throttle shaft 17 at the other side of the throttle shaft. An end of an accelerator wire 22 connected to an accelerator pedal (not shown) of the vehicle is fixed to the wire connector 20 and an end of a rod 23 of the actuator 8 is located adjacent to an end portion of the lever 21. Referring to FIGS. 3 and 4, the actuator 8 is secured to a support 24 secured to the wall of the carburetor 3 and the end of the rod 23 is adjacent to a bent end portion 25 of the lever 21. The end of the rod 23 and the end portion 25 cooperate to act as the idling sensing switch 106 (FIG. 7) as will be hereinafter described.

FIG. 5 shows the internal construction of the actuator 8. The rod 23 is rotatably supported by a bearing 27. The rod 23 is formed with a thread 26 which is engaged with a screw formed in a bearing 28. The rod 23 is secured to a gear 32. Although the rod is made of metal, the bearings 27, 28 and the gear 32 are made of plastic. Accordingly, the rod is insulated from the body of the actuator 8. A terminal 30 is secured to the body of the actuator through an insulating plate 29. A brush 31 is secured to the terminal 30 and elastically engaged with the periphery of the rod 23.

The gear 32 engages with a pinion 33 securely mounted on a shaft 34, the end of which has a gear 35 secured mounted thereon. The gear 35 is engaged with a pinion 36 secured to a shaft 37 of a motor 38.

Referring to FIG. 6 showing the vehicle speed sensor 13, a plurality of permanent magnets 39 are circumferentially arranged on a shaft 42 connected to the speedometer cable 15 and secured thereto. The magnets 39 with their polarities as indicated are separated, for example, from each other by synthetic resin 41 or other insulation secured on the shaft 42. A reed switch 40 is provided on a support 43 and positioned in the vicinity of the magnets 39 with a slightly spaced therefrom forming a gap therebetween. Thus, the reed switch 40 is turned on and off during the rotation of the speedometer cable 15.

Figure 7:
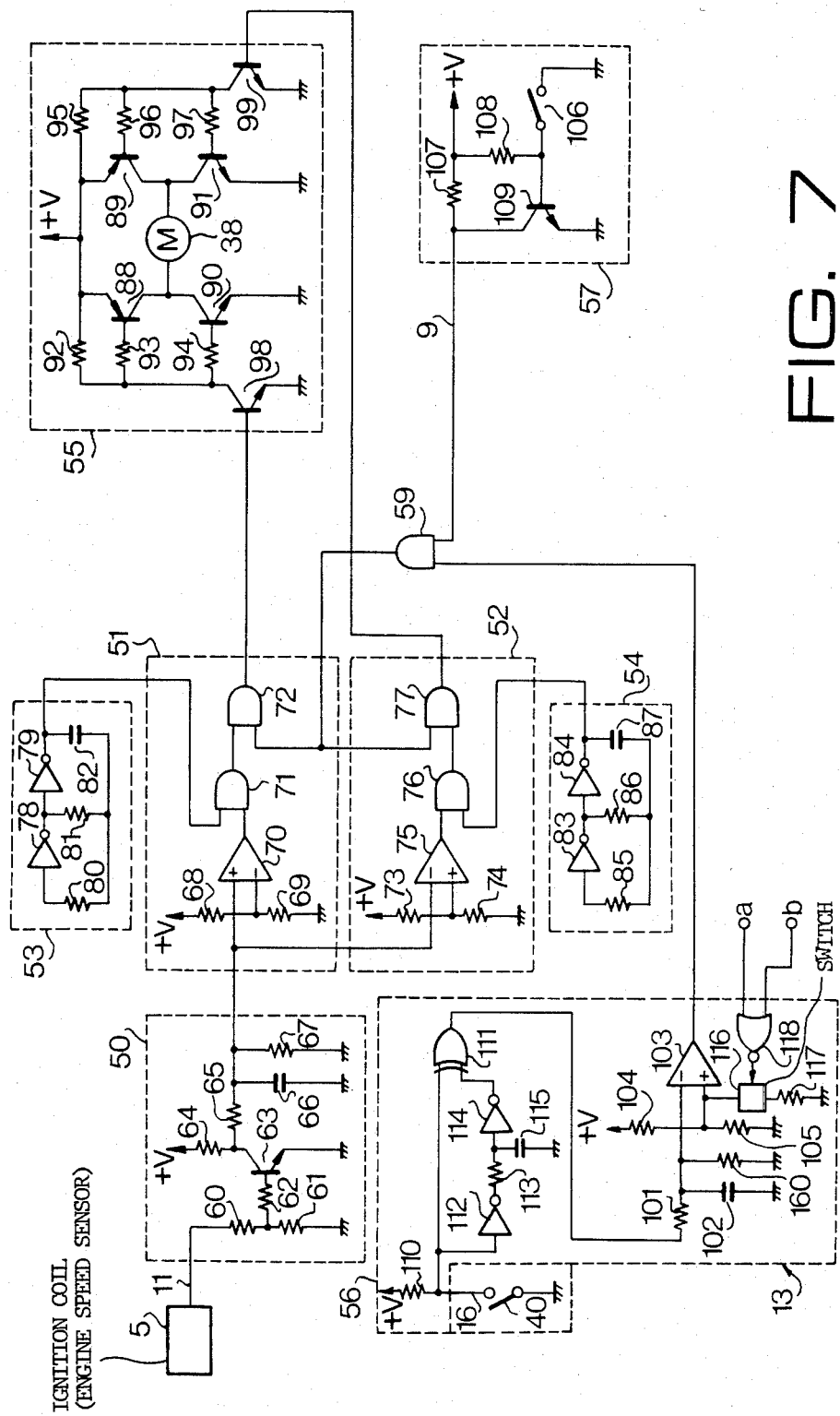
FIG. 7 is an electric circuit of an engine speed control circuit employed in the system.

Referring to FIG. 7, the control circuit 10 generally comprises an engine speed signal generating circuit 50, an engine speed increasing signal generating circuit 51, and an engine speed decreasing signal generating circuit 52, oscillators 53 and 54, an actuator control circuit 55, a vehicle speed signal generating circuit 56, an actuator signal generating circuit 57, and an AND gate 59 as a control gate.

The engine speed signal generating circuit 50 is applied with pulses from the ignition coil 5, which causes the switching of a transistor switching circuit comprising resistors 60, 61, 62 and a transistor 63. The collector of the transistor is connected to a positive voltage source through a resistor 64 and to an integrating circuit comprising resistors 65, 67 and a capacitor 66.

The output of the engine speed signal generating circuit 50 is connected to a non-inverting input of the comparator 70 of the engine speed increasing signal generating circuit 51 and connected to an inverting input of a comparator 75 of the engine speed decreasing signal generating circuit 52. The inverting input of the comparator 70 is connected to a voltage divider comprising resistors 68 and 69 and the output thereof is connected to an AND gate 71. The output of the AND gate 71 is connected to an AND gate 72 for producing an engine speed increasing signal. The non-inverting input of the comparator 75 is connected to a voltage divider comprising resistors 73 and 74, and the output thereof is connected to an AND gate 76. The output of the AND gate 76 is connected to an AND gate 77 for producing an engine speed decreasing signal. Oscillators 53 and 54 comprise inverters 78, 79, 83 and 84, resistors 80, 81, 85 and 86, and capacitors 82 and 87, respectively. Pulses from the oscillator 53 are applied to the AND gate 71 and pulses from the oscillator 54 are applied to the AND gate 76. AND gates 72 and 77 are applied with an output of the AND gate 59.

The actuator control circuit 55 for engine speed control has PNP transistors 88 and 89, NPN transistors 90 and 91 which are connected with each other in bridge form. The motor 38 is connected between collectors of two pairs of the transistors. The actuator control circuit 55 further comprises a pair of transistors 98 and 99 and resistors 92 to 97 for applying voltages to each transistor. The base of the transistor 98 is applied with an output of the AND gate 72, and the base of the transistor 99 is applied with an output of the AND gate 77.

The output of the vehicle speed sensor 13 comprising the reed switch 40 is connected to a positive voltage source via a resistor 110, and to an EXCLUSIVE-OR gate 111, and to an inverter 112 of the vehicle speed signal generating circuit 56. The EXCLUSIVE-OR gate 111 and the inverter 112 form a one-shot multivibrator together with a resistor 113, an inverter 114 and a capacitor 115. The output of the EXCLUSIVE-OR gate 111 is connected to the inverting input of a comparator 103 via a resistor 101. Between the inverting input and the ground, a capacitor 102 and a resistor 160 are connected. The non-inverting input of the comparator 103 is connected to a voltage divider comprising resistors 104 and 105. The output of the comparator 103 is connected to one of the inputs of the AND gate 59. Between the non-inverting input of the comparator 103 and the ground, an analogue switch 116 and a resistor 117 are connected in series. The control gate of the analogue switch 116 is connected to the output of a NOR gate 118, which will be described hereinafter.

The actuator signal generating circuit 57 includes the actuator contact idling sensing switch 106 which is formed by the end of the rod 23 and the end portion 25 of the lever 21. An end of the switch 106 is grounded and the other end is connected to the voltage supply through a resistor 108 and to a base of a transistor 109. The collector of the transistor 109 is connected to the voltage supply through a resistor 107 and to the input of AND gate 59.

Figure 8:
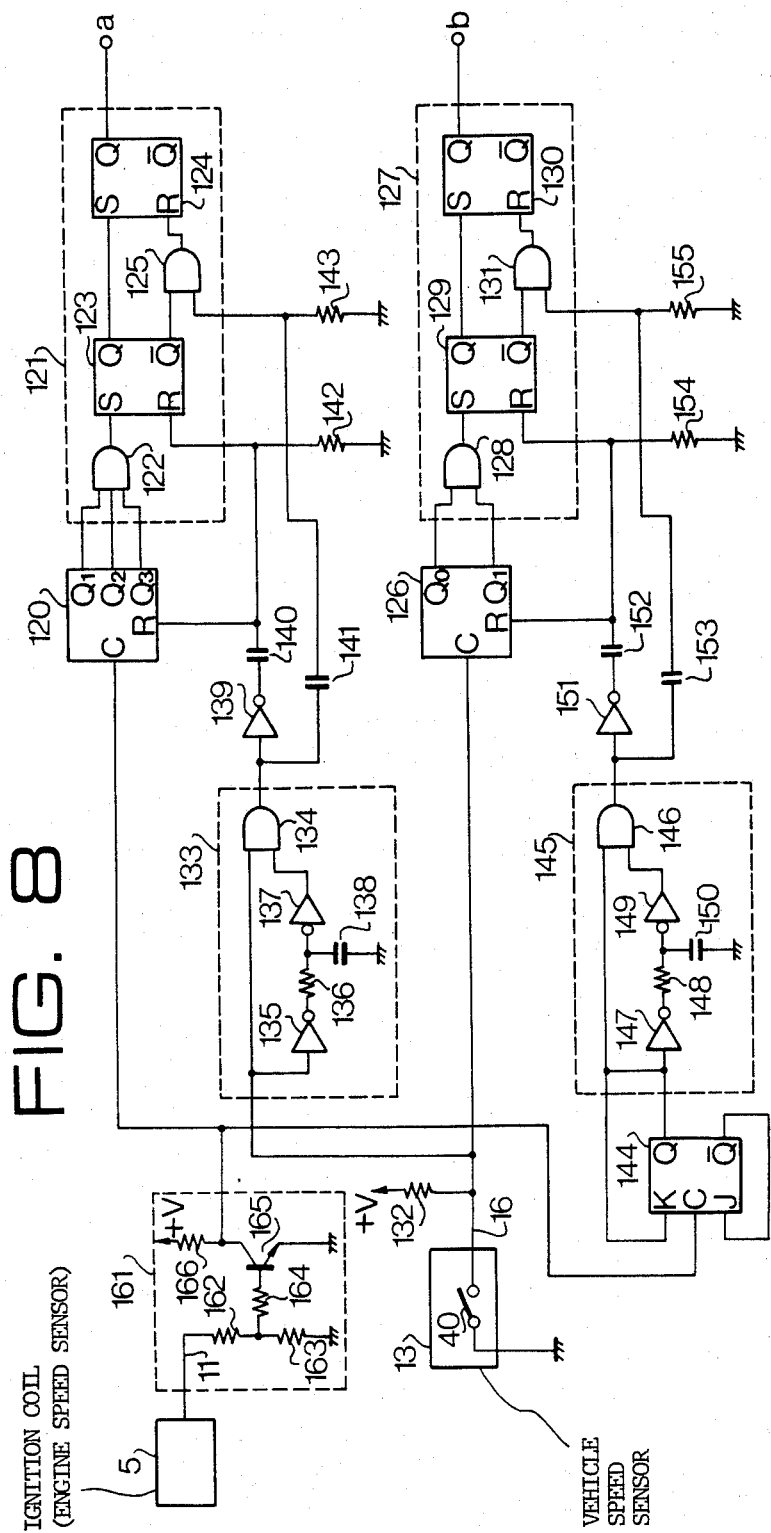
FIG. 8 is an electric circuit of a neutral state detecting circuit of the present invention.

Referring to FIG. 8 showing a neutral state detecting circuit, an upper circuit portion of the circuit is an operation circuit for the neutral state of zone A and a lower circuit portion is an operation circuit for the neutral state of zone B. The output of the ignition coil 5 is connected to a waveform shaping circuit 161. The waveform shaping circuit 161 comprises a transistor 165 and resistors 162, 163, 164 and 166. The output of the waveform shaping circuit 161 is connected to a clock input C of a counter 120. Outputs $Q_1$ and $Q_2$ and $Q_3$ of the counter 120 are applied to an AND gate 122 of a first neutral state judging circuit 121. The output of the AND gate 122 is connected to an S input of a flip-flop 123, the Q output of which is in turn connected to an S input of a flip-flop 124. The $\overline{Q}$ output of the flip-flop 123 is connected to the R input of flip-flop 124 through an AND gate 125.

The reed switch 40 connected to the positive source via a resistor 132 is connected to a clock input C of a counter 126. Outputs $Q_0$, $Q_1$ of the counter 126 are connected to an S input of a flip-flop 129 through an AND gate 128 of a second neutral state judging circuit 127. The Q output of the flip-flop 129 is connected to an S input of a flip-flop 130 and the Q input of the flip-flop 129 is connected to the R input of the flip-flop 130 through an AND gate 131.

The reed switch 40 is also connected to a one-shot multivibrator 133. The one-shot multivibrator 133 comprises an AND gate 134, inverters 135, 137, resistor 136, and capacitor 138. The output of the AND gate 134 is connected to the R input of the counter 120 and to the R input of the flip-flop 123 through an inverter 139 and a capacitor 140. Further, the output of the AND gate 134 is connected to the AND gate 125 through a capacitor 141. Both of the capacitors 140, 141 are grounded through resistors 142, 143, respectively.

The output of the waveform shaping circuit 161 is also connected to a clock input C of a J-K flip-flop 144. The Q output of the flip-flop 144 is connected to an AND gate 146 and to an inverter 147 of a one-shot multivibrator 145. The one-shot multivibrator 145 comprises a resistor 148, inverter 149 and a capacitor 150 in addition to the AND gate 146 and an inverter 147. The output of the one-shot multivibrator 145 is connected to the R input of the counter 126 and to the R input of the flip-flop 129 through an inverter 151 and a capacitor 152. Further, the output of the one-shot multivibrator 145 is connected to the AND gate 131 via a capacitor 153. Capacitors 152 and 153 are grounded via resistors 154 and 155, respectively.

In operation, referring to FIG. 7, pulses proportional to ignition pulses of the engine are applied to the engine speed signal generating circuit 50. Rotation of the front wheel 14 causes the shaft 42 (FIG. 6) of the vehicle speed sensor 13 to rotate and to generate output pulses in proportion to the vehicle speed on the end of the reed switch 40. As to the actuator contact idling sensing switch 106 (in circuit 57), if the accelerator pedal is depressed for acceleration of the engine, the end portion 25 of the lever 21 secured to the throttle shaft 17 is disengaged from the end of the rod 23, which means opening of the idling sensing switch 106.

Pulses applied to the engine speed signal generating circuit 50 turn on and off the transistor 63. The voltage on the end of the capacitor 66 varies in inverse proportion to the engine speed. The voltage at the capacitor 66 is applied to comparators 70 and 75. When the input voltage of the comparator 70 is higher than the lower limit reference voltage at the inverting input, which means a low engine speed, a high level output signal is applied to the AND gate 71. The AND gate 71 produces pulses according to the input pulses from the oscillator 53, which are applied to the AND gate 72. When the input voltage of the comparator 75 decreases below the upper limit reference voltage at the non-inverting input, which means the engine speed becomes high, a high level output signal is applied to the AND gate 76. The AND gate 76 produces pulses which are applied to the AND gate 77 similarly to the operation of the AND gate 71.

Referring to FIG. 9, $V-\beta$ is the lower limit reference voltage at the inverting input of the comparator 70 and $V+\beta$ is the higher limit reference voltage at the non-inverting input of the comparator 75. Therefore, the comparator 70 produces the high level output at the engine speed $N-\alpha$ corresponding to the voltage $V-\beta$ and the comparator 75 produces the high level output at the engine speed $N+\alpha$ corresponding to the voltage $V+\beta$. Accordingly, there is provided a non-operation engine speed zone $\alpha+\alpha$, one half on each side of a desired idling speed N.

The pulses from the reed switch 40 are applied to the one-shot multivibrator, comprising the EXCLUSIVE-OR gate 111 and inverters 112 and 114, etc., of the vehicle speed signal generating circuit 56. The one-shot multivibrator generates two pulses per one input pulse, that is per one on-off operation of the switch 40. The pulses are smoothed by the resistor 101 and the capacitor 102, so that a voltage proportional to the vehicle speed is applied to the inverting input of the comparator 103. If the NOR gate 118 produces a high level output, the analogue switch 116 is turned on. Thus, the non-inverting input of the comparator 103 is applied with a low voltage. When the vehicle speed signal exceeds a predetermined input voltage at the inverting input of the comparator 103, output of the comparator 103 changes from a high level to a low level. The changing of the output is selected to occur at a low vehicle speed, for example at 8 Km/h.

When the actuator contact sensing switch 106 is off, that is the lever 21 is disengaged from the rod 23, the transistor 109 is turned on, so that the actuator contact signal on the lead 9 is at a low level. However, if the actuator contact sensing switch 106 is on, the transistor 109 is turned off, so that the actuator contact signal goes to a high level.

It will be seen that AND gates 72 and 77 produce a high level output when the input applied from the AND gate 59 is at a high level and that the AND gate 59 produces a high level output when all inputs applied from the vehicle speed signal generating circuit 56 and the actuator signal generating circuit 57 are at high levels. The conditions are as follows:
(A) Vehicle speed is lower than a predetermined speed:
(B) The lever 21 engages the end of the rod 23.

Under these conditions, the AND gate 59 produces a high level output to open the AND gates 72 and 77 for controlling the idling speed.

When the engine idling speed is lower than the speed $N-\alpha$ (FIG. 9), the comparator 70 produces a high level output which actuates the AND gate 71 to produce pulses. The pulses are applied to the base of the transistor 98 of the actuator control circuit 55 through the AND gate 72 to periodically turn on the transistor. As a result, the transistors 88 and 91 are turned on, so that current passes through the transistor 88, motor 38, and transistor 91, which causes the rotation of the motor 38 in one direction. The rotation of the motor is transmitted to the rod 23 through the gears 36, 35, 33 and 32, so that the rod 23 projects to push the lever 21. Thus, the throttle valve 18 is rotated to open the induction passage to increase the engine idling speed.

When the engine idling speed exceeds the speed $N+\alpha$, the comparator 75 produces a high level output, so that the transistor 99 of the actuator control circuit 55 is turned on in a similar manner to the circuit 51. Thus, the transistors 89 and 90 are turned on and the motor 38 rotates in reverse, so that the rod 23 is retracted. The throttle valve 18 is rotated by the spring 19 to close the passage to decrease the engine idling speed. Thus, the engine idling speed is automatically maintained at the desired idling speed N.

Conditions when the above-described speed control is not effected are as follows:
(C) Vehicle speed is higher than a predetermined value and the output of the circuit 56 changes to a low level:
(D) Engine is accelerated and the actuator contact sensing switch 106 is turned off, so that the actuator signal of the actuator signal generating circuit 57 goes to a low level.

Under at least one of these conditions, the output of the AND gate 59 goes to a low level thereby stopping the motor control operation.

Describing the operation for detecting the neutral state with reference to FIG. 8, when the vehicle is driven by the engine 1, the vehicle speed varies at a ratio dependent on the transmission ratio of the speed gear selected in the transmission provided for the engine. FIG. 10 shows the relationship between the engine speed and the vehicle speed. It will be seen from the graph that zone A and zone B are ranges in which the vehicle speed is not proportional to the engine speed. In other words, zones A and B are out of the transmission ratio range, that is, engine-speed to vehicle-speed ratio is excessively high in the zone A and is excessively low in the zone B. Therefore, when the point determined by the engine speed to vehicle speed ratio is in the zone A or zone B, the engine output to transmission system is cut off, that is the transmission is in the neutral state.

In the disclosed system, the neutral state of zone A is detected by counting ignition pulses from the engine speed sensor comprising the ignition coil 5 in the period of each pulse from the vehicle speed sensor 13 (reed switch 40). When the number of the ignition pulses is greater than a predetermined number, the system judges that the point determined by the engine speed to vehicle speed ratio is in the zone A as will be described hereinafter.

Ignition pulses shaped by the waveform shaping circuit 161 are counted by the counter 120. When the counter 120 counts fourteen pulses, $Q_1$, $Q_2$, $Q_3$ outputs go to high levels causing the AND gate 122 to produce an output to set the flip-flop 123.

On the other hand, the vehicle speed signal pulse from the reed switch 40 operates the one-shot multivibrator 133 to produce an output pulse having a predetermined width. The output pulse of the one-shot multivibrator 133 is differentiated by the capacitor 141 and resistor 143. The triangular pulse produced by differentiating the positive-going voltage of the output pulse is applied to the AND gate 125 to reset the flip-flop 124. In addition, the negative-going voltage of the output pulse of the one-shot multivibrator 133 is also differentiated by the capacitor 140 and resistor 142 and resets the counter 120 and the flip-flop 123. Thus, the counter 120 and the flip-flop 123 are reset with a time lag corresponding to the width of the output pulse.

Describing the operation of the first neutral state judging circuit 121, under the power transmitting condition, the engine speed signal and the vehicle speed signal are in a proportional relation. Therefore, the counter 120 is reset by the output signal of the one-shot multivibrator 133 before the counter counts fourteen ignition pulses from the engine speed sensor comprising the ignition coil 5. When the transmission is in the neutral state, the counter 120 counts fourteen pulses causing the AND gate 122 to produce an output which sets the flip-flops 123 and 124. Thus, the flip-flop 124 produces an output a as a zone A signal. When the output pulse of the one-shot multivibrator 133 goes to a low level and the reset is produced at the capacitor 140, the counter 120 and flip-flop 123 are reset. Although the $\overline{Q}$ output of the flip-flop 123 goes to a high level, the other input of the AND gate 125 is at low level. Accordingly, the flip-flop 124 continues to produce the zone A output a. When the output of the one-shot multivibrator 133 goes to a high level and the reset pulse is applied to the AND gate 125, the flip-flop 124 is reset and the zone A output signal a disappears. On the other hand, the counter 120 starts to count after the reset pulse from the capacitor 140.

The operation of the zone B neutral state detecting circuit is similar to that of the zone A neutral state detecting circuit. In the system for the zone B, the zone B is detected by counting the vehicle speed signal pulses during an ignition pulse. When the counter 126 counts three pulses, the $Q_0$ and $Q_1$ outputs go to high levels causing the AND gate 128 to produce a high level output. On the other hand, when an ignition pulse is applied to the one-shot multivibrator 145 through the flip-flop 144, an output is produced for a predetermined period. The output is differentiated by capacitors 152, 153 and resistors 154, 155, the outputs of which reset the counter 126, and the flip-flops 129, 130. When the reset signals are generated after the three count of the counter 126, a zone B neutral state signal b is produced from the Q output of the flip-flop 130. If the reset operations are performed before the three count, the zone B neutral state signal b is not generated. In other words, the engine speed is proportional to the vehicle speed.

Thus, in accordance with the present invention, the neutral state of the transmission can be reliably detected.

In the system of FIG. 7, the neutral signals are used for the automatic, engine speed control. The A or B zone neutral state signals a or b are applied to the NOR gate 118, so that the NOR gate produces a low level output. Therefore, the analogue switch 116 is off, so that the reference voltage at the non-inverting input of the comparator 103 is raised to a high value. Thus, the automatic, engine speed is carried out in a higher vehicle speed range than the vehicle speed range at the idling state (below 8 km/h).

What is claimed is:

1. A system for detecting a neutral state of a transmission for an engine mounted on a vehicle, the transmission having a plurality of transmission ratios dependent on change speed gears of said transmission, the system comprising an engine speed detecting means for producing an engine speed output in proportion to the engine speed;

a vehicle speed detecting means for producing a vehicle speed output in proportion to the vehicle speed;

an operation circuit means for judging whether the ratio of said engine speed output to said vehicle speed output is in a range of the transmission ratios dependent on said transmission;

said operation circuit means producing at least one neutral state output when said ratio is outside of said range of said transmission ratios, thereby detecting the neutral state of the transmission, said engine speed detecting means produces output pulses and said vehicle speed detecting means produces output pulses, said operation circuit means comprises, counter means for counting said output pulses from one of said detecting means and for producing a first signal when counting a predetermined number of the pulses before said counter means is reset, first circuit means responsive to each of said output pulses from the other detecting means for producing a second signal for resetting said counter means thereby determining a respective period of operation of said counter means, and second circuit means including gate means responsive to said first and second signals for producing said neutral state output in dependency on the result of said counting during said period.

2. The system for detecting a neutral state of a transmission for an engine in accordance with claim 1, wherein said second circuit means including gate means comprises, a first RS flip-flop and a second RS flip-flop connected in series from said counter means, said first circuit means is connected to said counter means and said first RS flip-flop for simultaneous resetting, said gate means is connected to the reset input of said second RS flip-flop and in cooperation with said first circuit means is for resetting said second RS flip-flop with delay after said counter means and said first flip-flop are reset.

3. The system for detecting a neutral state of a transmission for an engine in accordance with claim 2, wherein said gate means has one input connected to the $\overline{Q}$ output of said first RS flip-flop and another input connected to said first circuit means.

4. The system for detecting a neutral state of a transmission for an engine in accordance with claim 2, wherein said first circuit means is a one-shot multivibrator and includes an inverter at the output of said one-shot multivibrator, said another input of said gate means is operatively connected to one side of said invertor and the other side of said invertor is operatively connected to said counter means and said first RS flip-flop for the resetting.

5. A system for detecting a neutral state of a transmission for an engine mounted on a vehicle, the transmission having a plurality of transmission ratios dependent on change speed gears of said transmission, the system comprising an engine speed detecting means for producing an engine speed output in proportion to the engine speed;

a vehicle speed detecting means for producing a vehicle speed output in proportion to the vehicle speed;

an operation circuit means for judging whether the ratio of said engine speed output to said vehicle speed output is in a range of the transmission ratios dependent on said transmission;

said operation circuit means is for producing two neutral state outputs when said ratio is outside of said range of said transmission ratios, thereby detecting the neutral state of the transmission, said engine speed detecting means produces output pulses and said vehicle speed detecting means produces output pulses, said operation circuit means comprises, a first counter means for counting said output pulses from said engine speed detecting means and for producing a first signal when counting a predetermined number of the pulses, a first circuit means responsive to each of said output pulses respectively from the vehicle speed detecting means and for producing a second signal for determining a respective period of operation of said counter means, a second counter means for counting said output pulses from said vehicle speed detecting means and for producing a third signal when counting a predetermined number of said output pulses from said vehicle speed detecting means, a second circuit means responsive to each of the output pulses from said engine speed detecting means for producing a fourth signal for determining a respective period of operation of said second counter means, and third and fourth circuit means including gate means responsive to said first to fourth signals for producing said neutral state outputs in dependency on the result of said counting during said periods, respectively.

6. A system for detecting a neutral state of a transmission for an engine mounted on a vehicle, the transmission having a plurality of transmission ratios dependent on change speed gears of said transmission, the system comprising an engine speed detecting means for producing an engine speed output in proportion to the engine speed;

a vehicle speed detecting means for producing a vehicle speed output in proportion to the vehicle speed;

an operation circuit means for judging whether the ratio of said engine speed output to said vehicle speed output is in a range of the transmission ratios dependent on said transmission;

said operation circuit means for producing at least one neutral state output when said ratio is outside of said range of said transmission ratios, thereby detecting the neutral state of the transmission, an idling speed control circuit for controlling the idling speed of said engine under conditions of vehicle speed, said idling speed control circuit includes a comparator having one input operatively connected to said vehicle speed detecting means, means connected to said operation circuit means for receiving said neutral state output and for increasing the voltage applied to another input of said comparator when said neutral state output occurs so as to increase the range of the idling speed control to higher vehicle speeds, said comparator is an operational amplifier, said one input thereof is an inverting input and said another input is a non-inverting input, and said means connected to said operation circuit means includes a switch means.

7. The system for detecting a neutral state of a transmission for an engine in accordance with claim 6, wherein said means connected to said operation circuit means includes a logic circuit means connected to said switch means.

* * * * *